United States Patent [19]

Propp

[11] 4,186,237
[45] Jan. 29, 1980

[54] MULTI-COMPONENT PROTECTIVE COVERING FOR CONSTRUCTION PARTS DESIGNED TO PROTECT AGAINST THE EFFECTS OF LIGHTNING

[75] Inventor: Horst-Joachim Propp, Bremen, Fed. Rep. of Germany

[73] Assignee: Vereinigte Flugtechnische Werke-Fokker GmbH, Bremen, Fed. Rep. of Germany

[21] Appl. No.: 763,561

[22] Filed: Jan. 28, 1977

Related U.S. Application Data

[63] Continuation-in-part of Ser. No. 558,664, Mar. 17, 1975, abandoned.

[51] Int. Cl.² ............... B32B 5/16; B32B 15/08; B32B 15/16; B64C 1/00; H02G 13/00
[52] U.S. Cl. ........................... 428/323; 174/2; 244/1 A; 244/133; 361/117; 361/212; 361/216; 361/218; 427/123; 427/124; 427/126; 428/339; 428/913; 428/912
[58] Field of Search ............... 428/68, 922, 913, 306, 428/323, 339; 427/124, 404, 407, 423, 123, 126; 361/117, 212, 218, 216; 174/2; 244/1 A, 133

[56] References Cited

U.S. PATENT DOCUMENTS

| | | | |
|---|---|---|---|
| 2,933,732 | 4/1960 | Tanner | 361/218 |
| 2,982,494 | 5/1961 | Amason | 174/2 |
| 3,416,027 | 12/1968 | Amason et al. | 174/2 |
| 3,498,572 | 3/1970 | Lumn | 361/218 |
| 3,572,609 | 3/1971 | Slawson | 361/218 |
| 3,600,632 | 8/1971 | Brignt et al. | 361/218 |
| 3,755,713 | 8/1973 | Paszkowski | 361/218 |
| 3,759,739 | 9/1973 | Varlas | 427/404 |
| 3,906,308 | 9/1975 | Amason et al. | 361/218 |
| 3,965,285 | 6/1976 | Hill | 361/212 |
| 3,989,984 | 11/1976 | Amason et al. | 361/212 |

FOREIGN PATENT DOCUMENTS 2142242  1/1973  France ........................ 361/212

Primary Examiner—J. C. Cannon
Attorney, Agent, or Firm—Smyth, Pavitt, Siegemund, Jones & Martella

[57] ABSTRACT

Construction parts are protected against lightening by a layer which releases a cloud of ionized and ionizable particles to spread the area affected by the lightening flash and to fan out the current path. The layer may include additives which swell when heated to increase the volume and density of the cloud. An electrically and thermal conductive layer or two such layers each having predominantly one of these properties is provided underneath the releasing layer.

22 Claims, 2 Drawing Figures

MULTI-COMPONENT PROTECTIVE COVERING FOR CONSTRUCTION PARTS DESIGNED TO PROTECT AGAINST THE EFFECTS OF LIGHTNING

This application is a continuation-in-part of Ser. No. 558,664, filed Mar. 17, 1975, and now abandoned.

BACKGROUND OF THE INVENTION

The present invention relates to protective covering of plastic or metal parts, and more particularly, the invention relates to the protection of such construction parts in aircraft against damage, for example, from lightening.

Since plastic parts have relatively light weight they are used to an increasing extent. These plastic parts are, of course, usually electrical insulators. Unfortunately, the employment of insulative plastics reduces the safety aspect as far as lightening is concerned. Aircrafts are inherently endangered by lightening, and when hit, some damage is caused particularly because of the concentration of structure parts in the limited space of the craft. That damage is the greater the more parts are made of low conductive material. Therefore, the problem exists to protect such plastic parts against lightening.

It is known generally to discharge electrostatic charges of plastic parts, for example, by means of so-called antistatic coatings. It has also been proposed to metal-coat such plastic parts so as to obtain continuous electrically conductive paths.

Various procedures have been proposed to apply a metal coat to such plastic parts, for example, by means of flame-spraying, galvanizing (plating), or by means of chemical deposition and precipitation or by bonding foils to these plastic parts. The surface of the plastic part has to be pretreated in either case to obtain satisfactory adhesion between the part to be protected and the cover, coating, lining, etc.

It is not believed that the problem outlined above has been satisfactorily solved thus far. The problem is compounded by the fact that such construction parts for aircraft which are exposed to the environment should be made erosion proof, because high speed water droplets have quite extensively a corroding effect. Still additionally, the construction parts should not be penetrated by moisture.

DESCRIPTION OF THE INVENTION

It is an object of the present invention to provide construction parts with a cover or surface lamination so that such parts when used, for example, in aircrafts are protected against damage resulting, for example, from lightening.

In accordance with the preferred embodiment of the invention, it is suggested to provide on the construction parts to be protected a basic protective layer which is characterized by host material containing substances which release particles and/or ions when exposed to an electric field such as preceding an oncoming flash of lightening. This layer either incorporates metal or, preferably, is covered by a thin metal foil or coating. Specifically, it was discovered that a flash of lightening is immediately preceded by a relatively large area, high electric field. This field is effective in tearing metal ions out of the metal layer and causes a release of ions or particles from the release layer which particles readily ionize and spread over an area much larger than the one that would be affected by the lightening in the absence of such a release layer. As a consequence, the lightening head is fanned out greatly and will "hit" or strike at a significantly reduced areal density as far as the resulting electric current flow is concerned. Moreover, the metal layer or metallic inclusions to the extent they are not released tend to distribute the field strength current flow density into metal layer, and the corresponding heat development is fanned out, and distributed. Thus, local concentration of electrical and thermal energy is prevented; that in turn avoids damage and destruction.

The ionization or release layer preferably comprises a synthetic resin or elastomeric material, lacquer, adhesive or other suitable plastic in the sense that it can serve as host material. This release layer should contain additives which release particles, possibly but not necessarily, as ions. Specifically, the additives upon release should form smoke and/or gas in the form of an ionized and ionizable cloud that spreads over the surface and adjacent regions. Tar derivatives, styrol and soot (carbon black) are preferred as additives for releasing ionized smoke. Salts, preferably subliming ones such as antimony trioxide ($Sb_2O_3$), and liquids or wax contained in microballoons are preferred as gas releasing substances.

In addition, it is desirable to add to the host layer materials exhibiting a large increase in volume with rising temperature, i.e. they swell and foam when heated to enlarge the volume of the ion particle cloud and increase its effective density as it develops above the part to be protected through the release of gas and smoke.

Generally speaking, a second reaction layer can be provided on top of the above mentioned release layer, or its function, namely electrical conduction can be incorporated in the latter. The metal layer, if a separate layer, serves as initial ion release layer and may be a bonded-on foil or mesh or a coating made by evaporation, spraying on galvanic depositing. This metal layer serves additionally as conductor of electrostatic charges.

Alternatively, this conductive layer on top of the particle release layer may be a conductive lacquer, i.e., a lacquer containing silver, copper, graphite or lacquers with metal pigments, e.g. aluminum. As stated, these various metallic particles can, however, be incorporated in the principle ion and particle release layer. However, in the case of such an incorporation, a still further layer should be interposed between the particle release layer and the construction part to be protected. This additional layer should be electrically insulating if that substrate, i.e., the construction part, is metallic.

On the other hand, if the principle particle release layer itself is not significantly electrically conductive, a metal layer should be provided under the release layer. This is necessary as the metal or conductive layer on top of the release layer will most likely be destroyed when lightening strikes. Thus, it is important that at least one electrically conductive layer be provided that is retained to distribute the electrical current of the flash. That layer must be a separate layer under the release layer unless the latter is provided with sufficient electrical conductivity to assume also the function of current distribution. Such a metal layer under the release layer provides also heat conduction to a heat conducting layer underneath, unless a heat insulation from the construction part to be protected, is needed. Certain metal oxides can be used here.

In the case heat conduction is needed underneath the release layer, the heat conducting layer can be made of metal or metal oxide. In the former case, however, one should interpose an electrically insulative layer between the metal layer and the ionization layer, to insulate the construction part from the electric current of the lightening flash. The metal layer underneath the release layer will merely bleed off currents resulting from secondary effects, e.g. induction. If one uses a metal oxide layer (e.g. beryllium oxide) on the plastic part as primary heat conductor, insulative protection is actually provided therewith. A metal layer should then be used as stratum between that metal oxide layer and the release layer. That metal layer conducts and distributes any undesired electric currents and enhances the heat conduction from the ionization layer to the metal oxide layer.

It can thus be seen that the invention resides in providing a multilayer assembly as protective cover in which two or more layers provide the following functions; Release of ions and release of ionizable ionible particles or gas when subjected to the field of an oncoming heat of a flash of lightening, whereby the particle and gas release continues after the flash has struck and has been fanned out due to the cloud of ions and ionizable particles; and distribution of electric current. At least one of the layers should be a coherent metal layer to provide additionally a barrier against moisture. Two metal layers are actually preferred, one on top as the fastest agent for the formation of an ion cloud, and a second layer for current distribution. Either function can be taken over, however, by metal pigmentation in the host layer that contains the particles to be released. The release layer may be baked to close all pores in which case that layer serves as moisture barrier. In either case, the inherent elasticity of the rather thick release layer functions to cause high speed water droplets to bounce thereoff and thus functions as a corrosion proofing layer.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding now to the detailed description of the drawing, FIG. 1 shows a plastic construction part 10 which may have any configuration and only a portion thereof is shown. The immediate surface 10a of that part interfaces with a surface lamination which is composed of three laminae or layers.

Figure 1:
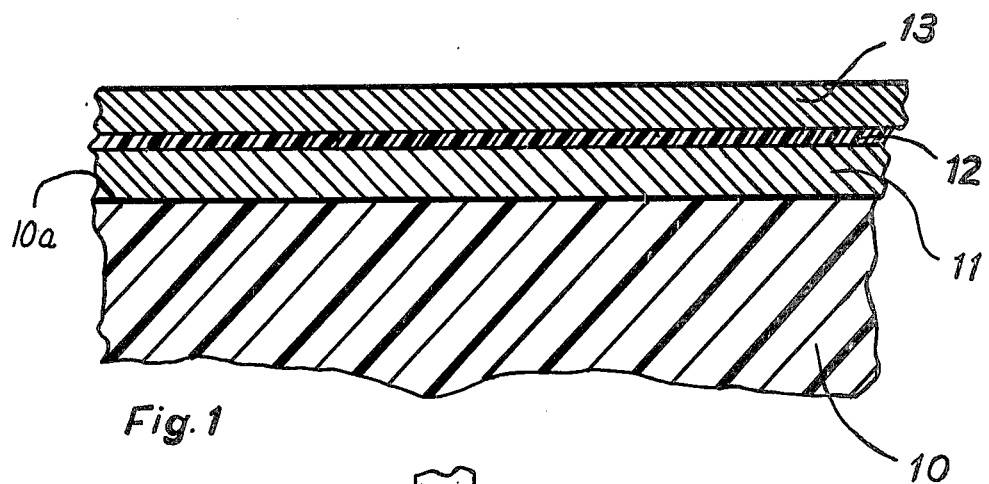
FIG. 1 is a cross-section through a first example for a simplified embodiment of the invention.

A first layer 11 consists of metal and is immediately applied to the surface 10a of part 10. Layer 11 serves primarily as heat conductor, to remove excess heat from the plastic part. The second layer 12 is disposed on top of 11 and is electrically insulative, serving primarily as insulative separator for isolating layer 11 from the third layer 13. Layer 13 is made of a material that releases ions and/or particles; it will be called ionization or ion and/or particle release layer. The insulation layer 12 is, however, not necessary.

These three (two) layers have been sequentially applied to part 10 by any known process techniques, such as flame spraying, galvanizing, i.e. plating, applying a foil or any other cladding technique or by means of chemical precipitation and depositing. This applies particularly for the electrically conductive layers; the plastic layer is preferably applied by spraying a curable plastic or applying a plastic foil.

The metal layer 11 is preferably made of copper, a copper-beryllium alloy or aluminum. The insulating layer 12 may be made of the same material that is used for part 10, or one can use a plastic which is an adhesive before curing, and maintains the bond thereafter. One may use here, for example, epoxy. The strength of the plastic should be comparable to that of the plastic part itself.

The ionization or particle release layer 13 may consist of synthetic resin or lacquers which include conductive pigments, fire proofing lacquers or parts which develop carbon upon application of high voltages. The basic compound or host material for the release layer may also be an epoxy resin, phenol resin, polyester resin, silicone, polyamide, polychlorophen, nitril or the like. The ions are developed by means of additives, such as copper pigments or copper oxide pigments, or other metal pigments, which are added to the base substance at a ratio of about 20 to 50% parts by weight. The development occurs specifically when the electric field of an oncoming flash interacts with the layer.

In addition, the layer 13 contains smoke forming substances such as styrol, tar derivatives and/or soot (carbon black). Smoke particles will be released by the layer accordingly. Still additionally, layer 13 may include substances that form and release gas and then replenish the particle cloud that hovers above following a flash of lightening. Metal salts can be used here, particularly those that sublime, for example antimony trioxide. Also, one may embed microballoons in layer 13 which contain liquids such as tetrachloroethanol ($C_2H_2Cl_4$) or wax. These substances will vaporize under the influence of the lightening current pulses.

As will be shown more fully below, one should additionally provide a swellable material to the plastic, which swells up and even bubbles during heating and, therefore, carries along more of the ions to the surface for increasing the effective conductive colume. One will use here ammonium phosphate, pentaerythritol or dicyan-diamid at a ratio from 16 to 22% parts by weight.

The FIG. 1 shows the three layer configuration in one-fold arrangement. One can, however, repeat the sequence and possibly change the sequence except that any ionization layer should always be insulated from the heat conducting-metal layer. This way, or by appropriate layer applying technique, one may provide more layers and/or thicker layers on surface portion of part 10, which seem to be more endangered, while thinner or a lesser number of layers may suffice in other portions.

The specific arrangement illustrated in FIG. 1 is destined for protection against lightening in areas which are less likely to be hit by lightening. The arrangement above has, however, the following additional features. The metal layer 11 protects the construction part 10 against moisture. Thus, this barrier against moisture serves a dual function. In addition, layer 13 has in most instances a significant resiliency so that water particles may bounce off. Thus, layer 13 yields under high speed impact of water droplets so that these droplets will not errode the surface of the part 10 itself or as covered. The layer 13 could be thermally heated to eliminate any porosity in which case the layer serves also as water barrier.

If such a part is struck by lightening, one obtains at first an activation of ionization and particle release layer 13, particularly by the electric discharge immediately preceding the striking by the lightening proper due to the electric field that precedes the lightening. As a consequence, ions are suddenly released due to the metal pigmentation followed by particles and gas release. This ionization release occurs in a much greater area than the one immediately struck by lightening, so that the current density (current per unit area) in layer 13 is considerably reduced as compared with the current density of the arriving arc. Further details of this current spreading operation will be discussed below after having described FIG. 2.

As a consequence of the ion development in the vicinity of the layer 13, lightening current is fanned out and the same is true with regard to any heat that is developed on account of the flash. Both features, therefore, reduce considerably any danger that the parts be damaged. The fanning out of the electrical energy reduces also the density of the accompanying electromagnetic forces so that delmination is avoided.

Figure 2:
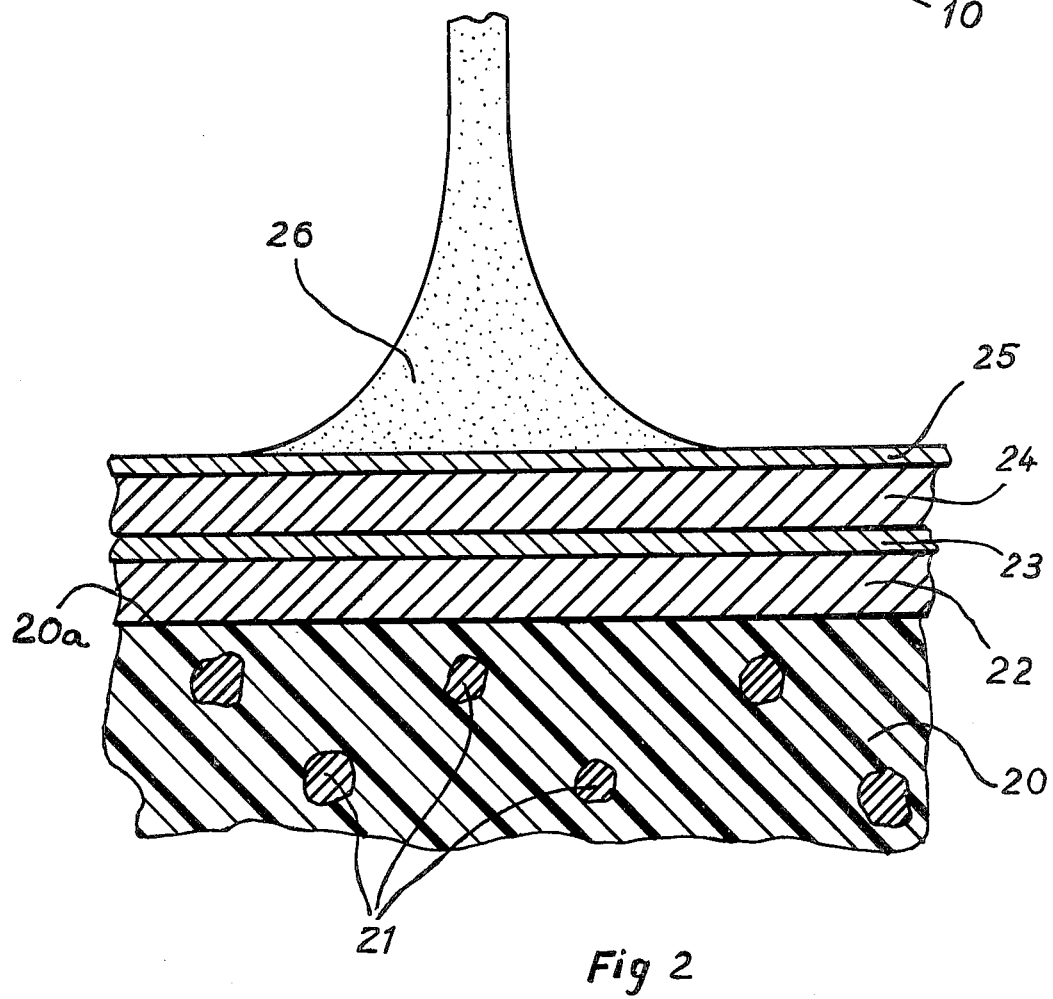
FIG. 2 is a similar cross-section through a second example, showing a more powerful protection of a plastic part against lightening.

The second example shown in FIG. 2 depicts a part 20 which is reinforced by fibers (metal or other plastic). Alternatively, part 20 may be of metal. Part 20 has a first surface layer 22 which is made of a metal oxide, such as beryllium oxide. As an oxide, this layer is an electrical insulator which is important, if part 20 is made of metal. This layer 22 serves as heat conductor if thermal dissipation is, in fact, necessary. Alternatively, layer 22 may be a metal oxide that provides electrical as well as thermal insulation. This is important if additional thermal dissipation is not needed or wanted, and if electrical insulation against, e.g., part 20, is still needed.

A layer 23 on top of 22 is comprised of metal (aluminum, copper, copper beryllium, etc.) serving here primarily as current conductor. It should be noted that if heat dissipation and electrical insulation is not needed against part 20 (being e.g. itself a very good electrical insulator), layer 22 can be omitted. Metal layer 23 can also be omitted if the layer above, 24, is sufficiently electrically conductive.

An ion and/or particle release layer 24 is disposed on layer 23, and layer 24 carries a metal layer 25, serving as protective and conductive layer. The layer 24 should be about 50 μm thick, and includes basically the substances or some of the substances as outlined above with reference to layer 13 of FIG. 1. Particularly, the layer 24 should include at least one smoke forming additive and/or one gas forming additive, each of the type outlined above. These additives should amount to 10% to 60% (weight). The inclusion of some metal pigmentation is not directly required here due to the provision of the metal layer 25. However, inclusion of metal pigmentation will serve as a means for replenishing ions after layer 25 has burnt off. The layer 25 will serve as primary source for ions as a flash of lightening approaches; ions released by metal pigmentation in layer 24 merely augments these metal ions. However, if layer 23 has been omitted, layer 24 must take over in parts the function of current distribution. This means that one needs at least 15% (weight) conductive additives (metal pigments).

Layer 25 is a thin metal coating just 15 to 35 μm thick, (i.e. about a mil) and being made of aluminum, copper or beryllium copper. The layer may be a conductive lacquer or varnish that includes silver, copper, graphite. The lacquer itself may not be conductive but it contains metal particles, e.g. aluminum or copper pigmentation. The pigmentation content should be at least 5% (weight), but not more than about 60% (weight). Layer 25 may be a foil or mesh or a vapor deposited, sprayed-on or galvanically deposited layer.

Layer 25, when sufficiently dense, provides also adequate protection against penetration of water. Moreover, it will act as an elastic diaphragm when high speed water droplets hit this layer while layer 24 yields elastically so that erosion is avoided. It should be noted that an additional layer of, e.g. paint may cover layer 25 serving also as a mechanical protection as layer 25 is quite thin.

If lightening strikes as shown, for example, in FIG. 2, the initial electric field at the head of the flash induces currents and causes (locally) evaporation of the metal of layer 25. Accordingly, an ion cloud is generated immediately, meeting the oncoming flash. In addition, the ion release additives in layer 24 are activated by the electric field of the oncoming flash. Please note here the differing mechanism of ion release involved. The metal ions are generated on account of the strong current that vaporizes the metal of layer 25. The metal pigmentation (if any) in layer 24 is activated by field polarization, wherein the electric field tears the ions from the layer.

The initial ion release is followed by a release of particles from layer 24 (smoke and/or gas) to replace and replenish the ions of the initial metal vapor cloud and offers a spreading, plasma-like conduction zone to the lightening. Particularly plural, rapidly succeeding flashes, as is often the case, find a cloud the ions of which are continuously replenished. The plasma is composed of pigment-metal ions, but also of combustion products, soot, and of gases resulting from thermal evaporation.

It can thus be seen that layers 25 and 24 could also be termed primary and secondary reaction layers. Metal ions torn from layer 25 provide for an initial ion cloud which is replenished by ions that are released from layer 24 which, in turn, are replenished by smoke and/or gas particles which vaporize and replenish the plasma; they will ionize under the impact of the current of the fanned out lightening flash.

Since particles develop also in the interior of layer 24, particularly when several flashes strike, layer 24 serves as source for ions beyond the initial development on a, relatively speaking, long term basis. Additionally, it was mentioned that layer 24 includes swell additives which are the source of the gases and cause as such a volume increase of the effective layer, while enhancing the density of the plasma cloud. As a consequence, the zone 26 is considerably enlarged in width and depth, so that the flash proper covers a widened area in which the current flow is fanned out laterally and in depth to reduce the effective current density and density of heat development in surface near areas. Also, the electromagnetic forces resulting from the current flow and effective on the laminations are reduced because the contour of the layer can be used to reduce any effective and field enhancing curvature.

The swelling effect of the respective additives in layer 24 does not just enlarge the conductive volume as such, but the released gas carries the ions away from the part to be protected. Moreover, that gas serves also as electric insulation in that the current from the lightening is more and more carried on the outside of the part. Finally, the gaseous cloud as such enhances thermal insulation with regard to heat developed by the current flow in the cloud. This way, one provides also for some relief of the pressure as otherwise exerted on the plastic part, if the current were too concentrated right at, above or even in the plastic part to be protected.

It can thus be seen that aircraft parts can still be made of plastic, so that the advantage of low weight can be retained. On the other hand, the particular surface layers as provided establish effective protection against lightening. These layers can be quite thin, such as a few mills as stated and add only insignificantly to the weight of the parts. In order to provide protection against repeated lightening flashes, the ionization layer can be made thicker.

The utilization of a metal cover (FIG. 2, layer 25) for the more critical parts or portions of plastic parts serves primarily for speeding up the process to have a, so-to-speak, preliminary plasma available even before the lightening has actually struck. The thin metal layer will evaporate producing a large amount of ions, so that the somewhat later occurring release of ions by the layer underneath occurs while the flash head has spread already to some extent. Thus, use of a metal layer on top of the ionization layer enhances speed of the onset of the spreading effect for the flash as it hits.

The invention is not limited to the embodiments described above, but all changes and modifications thereof not constituting departures from the spirit and scope of the invention are intended to be included.

I claim:

1. An article of manufacture protected to a degree against the effects of lightning comprising:
   (1) a substrate having a covering comprising a material functioning to release ionized or ionizable particles alone or in combination with gas when subjected to the strong electric field preceding an oncoming flash of lightning to thereby generate the formation of a particle cloud above the substrate to fan out the lightning head; and
   (2) a conductive material functioning to distribute the electric current of a lightning flash.

2. The article as in claim 1 the release material including metal subliming salts.

3. The article as in claim 1 the covering including an additive which swells when heated to enhance the formation and enlargement of the cloud.

4. The article as in claim 1 and including a metal layer under the covering and a metal oxide layer between the latter metal layer and the construction part.

5. The article of claim 1 wherein the functioning materials are contained in a covering comprising a single layer.

6. The article of claim 1 wherein the material functioning ro telease gas under the conditions stated is a vaporizable substance contained in microballoons.

7. The article of claim 1 wherein the conductive material is in the form of metal.

8. The article as in claim 1, said covering including a material for the release of ions and further material for the release of ionizable gas, the materials being arranged in different, superposed layers.

9. The article of claim 1 wherein the functioning materials are contained in two different layers.

10. The article of claim 9 wherein the conductive layer comprises a lacquer containing conductive particles disposed over the layer containing the other functioning material.

11. The article of claim 9 wherein the conductive layer comprises a coherent metal layer.

12. The article of claim 1 wherein the covering comprises material capable of functioning to release and generate carbon particles under the condition stated to form a carbon particle cloud.

13. The article as in claim 12 the particle release material including styrol, tar derivatives or soot (carbon black) as smoke forming additives.

14. The article of claim 1 which includes a thin upper layer of metal.

15. The article as in claim 14 and said conductive material being included in a second metal layer under the said covering serving as a releasing layer.

16. The article as in claim 1, the covering additionally preventing penetration of moisture.

17. The article as in claim 16, the covering including a coherent metal layer constituting said conductive material.

18. As an article of manufacture to be protected against lightening, a construction part having a cover comprised of a first release layer of a plastic material which includes additives to release ionizable smoke or gas; an ion release layer on top of the first release layer and being about 1 millimeter thick and made of metal; and a metal layer underneath the first layer, so that ions are released by the metal ion release layer when the part is subjected to a strong local electrical field preceding the striking of the part by a flash of lightening thereby generating an ion cloud which is replenished by ionized particles from the first release layer to fan out the lightening head, the metal layer underneath the first release layer distributing current and dissipating heat.

19. An article of manufacture protected to a degree against the effects of lightening, comprising a construction part serving as substrate and having a covering comprised of a layer made of non-metallic host material which contains a substantial amount of metal-containing additives for releasing ions when subjected to a strong electric field preceding an oncoming flash of lightening and for distributing an electric current induced by the flash, said host material further containing additives for releasing ionizable particles when subjected to the said field so that a cloud of ionized and of ionizable particles develops above the part to fan out the lightening head.

20. The article as in claim 19, the releasing layer including additives which cause the layer to swell when heated to enhence the formation of the cloud.

21. The article as in claim 19, and including in addition a thin metal layer on the releasing layer.

22. The article as in claim 19, the releasing layer including microballoons containing the additive as vaporizable substances to be released as said ionizable particles.